3,780,191
PROCESS FOR REDUCING THE FAT CONTENT OF MEATS
Herbert R. Langer, 94 Carroll St., Manchester, N.H. 03102, and Arthur W. Langer, Jr., 175 Oakwood Road, Watchung, N.J. 07060
No Drawing. Filed Oct. 22, 1971, Ser. No. 191,772
Int. Cl. A22c 18/00
U.S. Cl. 426—231      19 Claims

ABSTRACT OF THE DISCLOSURE

The fat content of fat-containing meat is reduced by comminuting a frozen portion of the meat, thereby obtaining substantially discrete frozen meat particles and substantially discrete frozen fat particles. The particles are then mechanically separated into a substantially meat particle phase and a substantially fat particle phase.

BACKGROUND OF INVENTION

Various meat products, e.g. hamburger, sausage, frankfurters, are preferentially prepared from meat trimmings. However, due to consumer tastes and/or government regulation there are limitations on the maximum fat content of such products. As a result, these products must be prepared from relatively expensive cuts of meat whose fat content does not exceed such maximum or if the relatively inexpensive meat trimmings (having a fat content in excess of the maximum) are employed as the raw material, such trimmings must be combined with expensive lean meat to reduce the average fat content to an acceptable level.

Fatty meats and trimmings are conventionally "rendered" to recover the fat but the meat is not desirable for human consumption and its value is largely lost. "Rendering" involves heating the meat to a temperature above the melting point of the fat and thereafter removing the fat in liquid form. However, this prior art process is undesirable since it imparts an unacceptable taste to the meat. Further, since this process takes place at elevated temperature, the risks of meat spoilage and bacterial growth are significantly increased. Rendered meats are not suitable for use in frankfort sausage manufacturing because of loss or binding and color qualities and breakdown of the fat.

ADVANTAGES OF THE PRESENT INVENTION

It has now been unexpectedly found that the fat content of fat-containing meats may be significantly reduced by utilizing a process which does not impart any undesirable taste to the meat. Moreover, since the first step of the process is carried out with the meat in a frozen step, the risk of meat spoilage and bacterial growth is sharply reduced. Indeed the results of this process have shown no untoward meat spoilage and/or bacterial growth even where the subsequent step or steps of the process result in the temperature of the meat being raised above freezing (particularly since the subsequent step or steps take place in a very short period of time). Moreover, some embodiments of this process enable all steps to be carried out with the meat maintained in a substantially frozen state. The quality of the recovered meat concentrate is substantially unchanged from its original condition and may be used as a direct replacement for high quality meat of the same protein content.

DETAILS OF THE PRESENT INVENTION

The present invention, operable in a batch or continuous manner, entails two steps (in its broadest aspect):
(a) Comminuting a frozen portion of the fat-containing meat so as to obtain a mixture of substantially discrete frozen meat particles and substantially discrete frozen fat particles; and
(b) Mechanically separating the mixture resulting from step (a) into a substantially meat particle phase and a substantially fat particle phase.

The present invention is especially useful when the fat-containing meat to be processed is beef, pork or mutton. Beef plate is a particularly useful feedstock to a relatively simple type of mechanical separation, as is described in greater detail hereinbelow. The term "mechanical" separation as employed hereinabove is intended to cover all non-chemical separation processes other than those in which the meat is subjected to temperature treatment under conditions sufficient to cause the fat to be separated from the meat by melting thereof (i.e. "rendering").

The average particle sizes of the frozen meat and fat particles may vary, depending on the type of meat involved, fat content, type of mechanical separation process to be carried out, etc. However, the particles must be sufficiently small such that a high proportion of individual particles will consist of substantially all (e.g., greater than about 70 wt. percent) meat or fat by visual inspection; as a general rule, the meat particle sizes may vary widely but the fat particles will normally be less than ¼-inch diameter, preferably less than ⅛-inch diameter. The comminution of the frozen portion of the fat-containing meat may be accomplished by a variety of well-known methods such as shattering, chopping, shredding, chipping, cutting, etc.

In one embodiment of this invention, the mechanical separation step is accomplished by treating the mixture of substantially discrete frozen meat particles and substantially frozen fat particles with an inert fluid so as to cause the mixture to separate, within the fluid phase, into a substantially meat particle phase and a substantially fat particle phase. The inert fluid may be a gas such as air, nitrogen, carbon dioxide, fluorinated hydrocarbons and chlorofluorinated hydrocarbons or it may be a liquid having a density in the range of about 0.915 to 1.05 such as an edible oil (e.g., lard oil, vegetable oils, etc.), water, or mixtures, solutions, emulsions, etc., containing such oils and/or water and having the required density.

Irrespective of whether a gas or liquid is employed as the inert fluid, the amount of fluid required will depend on the amount of particles to be separated. As a general rule, a minimum of about one volume of inert fluid per volume of total particles will prove to be satisfactory. It is preferred that the inert fluid phase be recovered and recycled for re-use in the mechanical separation step, especially where the fluid is water. When water is employed as the fluid, some valuable meat juices are necessarily extracted during the mechanical separation step. Recovery and re-use of the water phase (containing such meat juices) will, in the course of several recycles, result in a phase in which the water and meat juices are at equilibrium, i.e. subsequent re-use of such a phase will not result in further significant extraction of meat juices.

Where the inert fluid is a gas, the mixture of particles may be readily separated by exposing it to a countercurrent flow of the gas by well-known fluidized solids techniques. The lighter (i.e. lower density) fat particles will flow to the top and may be removed along with the gas stream, leaving behind, for recovery by conventional methods, the meat particles. As a variation, the mixture is subjected to freeze-drying prior to contact with the gas stream. This will cause (as a result of water removal) void formations in the meat particles and the resultant porous meat particles will be lighter (have a lower density) than the fat particles. The lighter freeze-dried meat particles will then flow to the top and be recovered from the gas stream. Conventional freeze-drying methods (which result in the removal of sufficient water, e.g., about 20 to 80 wt. percent of the water present) may be used.

As a further variation on the fluidized gas technique, the mixture of frozen meat and fat particles may be transported in no more than a monolayer on a moving screen. Either above or below the screen there may be arranged a plurality of color detection cells and downstream of each cell there may be placed a jet adapted to admit a stream of inert gas responsive to a signal from the cell. As the moving screen travels over the cells and jets, the cell will detect the presence of a meat particle (due to its pink or red coloration) and transmit a signal to the appropriate jet downstream, which will then issue a stream of inert gas to impinge upon the meat particle detected by the cell and carry it upward where it may be recovered (leaving behind the fat particles on the screen). The location of the jet in relation to the cell will depend on the speed of the moving screen and the time required for receipt of the detected signal, transmittal of a signal to the jet and the initiation of the stream of inert gas from the jet. Fine focusing of the stream is desirable to avoid fat particles from being blown upward with the meat particles.

The inert fluid may be a liquid, e.g. edible oil, water, etc., with water being preferred. The mixture from step (a) is contacted with the fluid and within a short period of time the fat particles will float to the surface (where they may be readily skimmed off) and the meat particles will settle to the bottom and may be recovered from the liquid phase by filtration. Alternatively, the separation may take place by the use of centrifugation; particularly preferred are centrifuges which operate batch-wise or continuously and are capable of concurrent discharge of separate streams of the meat particle phase, fat particle phase and inert liquid phase.

Particularly useful results are obtained when water is used as the liquid and the temperature of the water at the outset, with respect to the amount of mixture to be separated, is such that the frozen meat particles will be at least partially thawed out during the water treatment, without concomitant substantial melting of the fat particles. Thus, initial water temperatures as low as about 33° F. and as high as the melting point of the fat (or higher) may be employed, depending on the time of contact of the mixture in the water, quantity of mixture, particle sizes, efficiency of heat transfer, original temperature of particles prior to water treatment, etc.

Since the water treatment may extract valuable meat juices from the meat particles, it is desirable to recover and recycle the water phase after the separation is completed. Eventual re-use of the water phase will result in a water phase at equilibrium with the meat juices, i.e., such as water phase will no longer have the capacity to extract substantial amounts of meat juices from the meat particles.

Another useful method of carrying out step (b) is to pass the mixture from step (a) over a cold surface maintained at a temperature below 32° F., e.g., 0–30° F. or lower, depending on various factors such as the temperature of the mixture, amount of mixture, volume of the cold surface, etc.; preferably, the mixture is warmed to cause at least surface melting of the meat particles prior to contact of the mixture with the cold surface. This technique will cause substantially only the meat particles to adhere to the cold surface whereupon they may be scraped off or otherwise recovered by conventional methods (e.g., pitched scraper, vacuum removal, removal by drop-off as surface is rotated and warmed, etc.).

Alternatively, the mixture resulting from step (a) may be separated by passing the mixture over a hot surface which is maintained at a temperature of at least the softening point of the fat. The temperature should not be maintained, however, at a temperature sufficient to melt the fat, since such excessive temperatures will result in the disadvantages recited hereinabove with respect to rendering. The exact temperature will be dependent upon several factors such as those indicated above with respect to use of a cold surface. The "hot surface" technique will cause substantially only the fat particles to adhere to the surface, leaving behind substantially only the meat particles for recovery by conventional methods. If the cold or hot surface is irregular (e.g., a dimpled drum) adhesion of the meat or fat particles, respectively, thereto will be improved.

Another useful separation technique is to pass the mixture resulting from step (a) between electrically charged plates. Substantially only the meat particles will be attracted to and adhere to one of the plates, while substantially only the fat particles will be attracted to and adhere to the other plate. The meat particles may then be recovered from the plate by conventional methods.

A relatively simple technique for separation is possible where the frozen portion to be comminuted is one in which the meat and fat are present as layers or striations, e.g. "beef plate." Upon comminution of a frozen portion of this material, it will be found that due to the toughness of meat, the comminuted meat particles will have an average particle size greater than that of the fat particles. Thereafter the resultant mixture may be hand sorted and/or screened with a sieve whose openings are equal to or larger than the average particle size of the fat particles but are smaller than the average particle size of the meat particles. The meat particles may then be recovered from the sieve by conventional methods. Good results are obtained with this type of product when the frozen portion is turned on end such that the direction of the comminutor is parallel to the plane of the meat striations. Particularly good results are obtained by cutting the frozen portion in such a manner that the cutter slashes the frozen portion parallel to the plane of striations and strips of meat cut therefrom may be recovered by conventional methods. Large chips or slices are preferably subjected to mechanical battering or shattering to break brittle fat away from the lean chunks. A rapid partial separation of the particles may be made on the basis of size in order to recover some of the larger concentrated meat particles while frozen. The remainder of the particles, which will contain a mixture of small particles of both fat and lean, can then be separated in a fluid to recover the rest of the meat fraction. In order to obtain the most efficient separation in the fluid, it is preferred to chop the particles more uniformly prior to addition to the fluid. In the most preferred process, the fluid is water and the fat and meat particles and water phase are separated and recovered by centrifugation.

The following examples, carried out batch-wise (it being understood that continuous operations are within the scope of this invention) are illustrative of this invention. Unless otherwise expressed, the percentages in these examples are weight percent.

EXAMPLE 1

A sample (about 60 lbs.) of frozen beef trimmings (temperature about −5° F.) of about 50% fat content by visual inspection was cut into chips (about ⅛-inch thick by ¼ to 4 inch length plus smaller particles) and thereafter cut into small particles (less than about ⅛-inch diameter) while still frozen. The resultant mixture of particles was slurried in 200 lbs. water for about 15 minutes at 50–70° F. Substantially only the fat particles floated to the top while substantially only the meat particles settled to the bottom. Fat particles were skimmed from the top and the meat particles were filtered from the water. Fat analyses were carried out using the conventional perchloric acid/acetic acid procedure on the water-wet fractions. The meat particle phase contained only 6% fat whereas the fat particle phase contained 70% fat. Therefore, a very sharp separation was accomplished in water on the basis of the different densities of fat and meat. Flaking and chopping the frozen trimmings broke apart the pieces in which fat was attached to meat and produced particles which were predominantly meat or predominantly fat.

EXAMPLE 2

Frozen beef plates (180 lbs.) (0° to 5° F.) containing about 50% fat were subjected to flaking and chopping as in Example 1. The particles (particle size of less than about ⅛-inch diameter) were separated in water as in Example 1 to produce 100 lbs. water-wet meat particles phase and 130 lbs. water-wet fat particles phase. A batch of frankforts was made in which the meat particles phase was substituted directly for the usual beef mixture. Excellent frankforts were obtained which analyzed 27% fat.

EXAMPLE 3

A series of tests were carried out on beef and pork trimmings to determine the effect of temperaure on the comminution step. The samples (size: about ¼ lb., each having a fat content range of about 50–90 wt. percent were frozen at −321° F. (liquid nitrogen), −108° F. (Dry Ice), −13° F. and 32° F. after which they were chopped 15–60 seconds in a Waring Blender and screened through a pre-chilled 8 mesh sieve. The chopped trimmings frozen at −321° F. resulted predominantly in fines of less than 8 mesh in which there was no significant selectivity as to meat or fat particles, however the coarser particles consisted predominantly of meat. Both the pork and beef particles separated rapidly in water at 77° F. to give a meat particles phase (precipitate) and a fat particles phase (floated to top). In 41° F. water, separation took longer because the meat thawed more slowly than at 77° F.

Chopping at Dry Ice temperature gave coarser particles and a higher proportion of particles larger than 8 mesh than at liquid nitrogen temperature. The coarse beef particles were more concentrated in lean meat and the fines were more concentrated in fat than the starting mixture, showing that fatty meats can be concentrated (to lean meats) by mechanical separation based on particle size. Both beef and pork particles separated cleanly in water into fat and lean meat fractions. The fat particle phase was removed by decantation and the lean meat particle phase was recovered from the water slurry by filtration.

Chopping at −13° F. produced a higher proportion of coarse particles than chopping at low temperatures. Very little separation of fat and lean meat was observed based on particle size. In water, separation was very good in both cases.

At 32° F. the blender was unable to chop either type of trimmings satisfactorily because the chunks were not sufficiently brittle to fracture into separate fat and lean meat particles.

These experiments show that the meat temperature should be below about 32° F., preferably below about 15° F., for the chopping or cutting operation to break apart the fat from the lean meat. The temperature of the water used in the separation step is not critical. Higher temperatures favor more rapid separation but lower temperatures are preferred to preserve meat quality. Although gravity separation was demonstrated, the observed properties of the meat/water slurry show that centrifugation would be preferred to obtain the most rapid separation at the lowest water temperatures with minimum loss of meat juices into the water.

The experiments also showed that chopping or fracturing of the fatty meat at temperatures below about −13° F. produced coarse particles of lean meat concentrate and fine particles of fat concentrate which can be separated by screening. These experiments further show that both fat and lean becomes increasingly brittle with decreasing temperature, but the fat can be shattered to smaller particle size permitting partial separation based on particle size.

This series of experiments also supports the conclusions that:

(a) Low temperatures (below about −13° F.) should be favorable for equipment having crushing or shredding action, whereas chopping or cutting would also be operable at higher temperatures (up to about 32° F.).

(b) Assuming equally good separation of lean meat and fat in the mechanical step, the coarser the particles the more rapid the separation into the separate components in a water slurry.

(c) Gravity separation based on density differences in water requires a water temperature above about 33° F., preferably between about 40° and 90° F. The lower part of the range is most preferred in order to preserve the meat quality. Coarse meat particles are preferred for the same reason.

(d) In a process using water slurry to separate the fat and lean meat into relatively pure components, the fat is easily recovered by flotation and decantation, by centrifugation, by screening, etc. The fat/water slurry could also be separated to recover the fat by heating the mixture to melt all of the fat, or enough to obtain a discrete oil/fat layer, followed by any conventional separation of immiscible liquids. The oil or oil/fat mixture may go directly to conventional fat rendering processes or other uses.

(e) The lean meat particle phase precipitated from water can be recovered by filtration in conventional equipment. Centrifugation also is feasible and is desirable based on the observed properties of the meat/water slurry.

EXAMPLE 4

In the previous examples, fine particles of lean meat did not separate from fat in 41° F. water until thawed. In order to demonstrate that frozen lean meat particles have higher density than frozen fat particles, coarse frozen lumps (greater than ⅛ in. diameter) were placed in water at 33° F. The lean meat particles settled rapidly to the bottom while the fat particles floated. This shows that the finer frozen particles can also be separated in water if centrifugation is used to provide sufficient driving force to separate particles having a smaller density differential while frozen than while thawed.

EXAMPLE 5

Beef plates are rectangular slabs which normally contain about 40–60% lean meat which is predominantly in layers parallel to the flat side. Packages of beef plates contain 4–5 plates piled in layers and frozen. In conventional meat processing, the rectangular slabs are fed endwise into a flaker, chipper or slicer. This cuts across the layers of fat and lean so that each flake or slice contains both components attached to each other. This procedure was followed in Examples 1 and 2.

In this experiment, the beef plates were cut by band saw into three pieces as shown by the dotted lines:

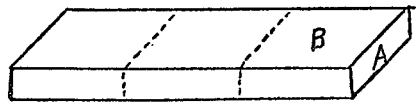

Instead of feeding edge A to the flaker as is customary, the pieces were turned up on edge A and face B was fed to the flaker to obtain chips or flakes from the same plane as B. Since the meat layers in the plates are also parallel to face B, the flakes cut through areas which are either predominantly fat or predominantly lean. Examination of the flakes showed that large differences in compositions were obtained, with many flakes being almost entirely lean or fat. Those flakes which contained both fat and lean were easily broken into large particles of fat or lean concentrates by mechanical shredding, shattering or chopping. When subjected to mechanical breaking, the frozen fat particles were shattered into smaller average size particles than the lean and a large part of the frozen lean was recovered simply by screening. The frozen lean particles from this process are the equivalent of fresh meat from high quality cuts and may be used in the same applications, such as making hamburg.

The larger particles, which were more cleanly separated into fat or lean particles in the flaking step, also were separated more rapidly and with less loss of juices by treatment with water as in Example 1.

The improved flaking procedure in this example directly produces particles in which more than 50% appears to be fat or lean concentrates in contrast to conventional flaking in which less than 10% appears to be discrete fat or lean particles.

These experiments showed that beef plates can be broken into fat and lean particles by mechanical action. The techniques should also apply to other fatty meats, such as pork, veal or mutton, where the fat and lean are present in discrete layers. An economical incentive exists for separating and concentrating the lean meat from mixtures containing between about 10% and 80% lean, preferably 20–70% lean.

Variables which may be controlled to obtain the optimum separation include the frozen meat temperature (lower temperatures favor smaller particles), the blade spacing in the flaker (smaller spacing produces smaller particles and more shattering) and the feed pressure against the flaker blades (lower pressure produces smaller particles).

In addition to flakers, other machines may be used to break fat away from lean. Slicers or choppers may be used to make chips less than ¼ inch thick, preferably less than ⅛ inch. Shredders are also useful.

EXAMPLE 6

The process of Example 1 is carried out in a continuous process in which the meat/water slurry is fed to a continuous centrifuge to accomplish separation more rapidly than by gravity. The separated water phase is recycled to the separation stage where it is contacted with more chopped meat and returned to the centrifuge together with some fresh make-up water. The recycled water phase reaches an equilibrium composition containing dissolved meat juices such that very little meat juices are lost after the first few cycles.

EXAMPLE 7

The procedure of Example 1 is followed except that the chopped particles are separated by gas fluidization. Using air, nitrogen, carbon dioxide, or perfluoro or perfluorochlorocarbon gases (such as Freons), the less dense fat particles are blown to the top where they are withdrawn separately from the more dense lean particles.

EXAMPLE 8

The procedure of Example 1 is followed except that mutton trimmings containing 70–80% lean meat are used in place of beef trimmings. The lean is concentrated to 90–95%. Because of the undesirable flavor of mutton fat, there is a greater incentive to upgrade relatively lean mutton into nearly fat-free meat.

EXAMPLE 9

Beef trimmings containing 20–30% lean meat are frozen, cut into chips using a flaker and then chopped into particles less than ¼ inch, preferably less than ⅛ inch diameter, following the procedures of Example 1. The particles are then freeze-dried to remove sufficient water from the lean particles to reduce their density by the formation of voids to a value less than that of the fat particles. The mixture is then subjected to gas fluidization, using air, nitrogen or carbon dioxide, to separate the lean particles as the lighter phase.

EXAMPLE 10

The procedure of Example 1 is followed except that the chopped particles are separated in lard oil having a density of 0.92. Because of the density being lower than water, only the particles which are nearly pure fat float to the surface. All other particles which contain even small proportions of meat settle to the bottom and are recovered with the meat phase. This separation is more selective than that achieved in water. However, lower density fluids are completely unsatisfactory because the fat phase will also settle and there will be no separation. Further, fluids having a density in excess of about 1.10 are undesirable because both the meat phase and the fat phase will float to the top and there will be no separation.

The examples set forth above serve to illustrate, but do not limit the scope of this invention. Conventional handling equipment, e.g., stainless steel belts, drums, etc., or those coated with a plastic film, may be useful in this invention. Further any type of comminution equipment which will result in particles which are discrete and are substantially either fat or lean meat may be used in step (a). Recovery of the separated fat and meat particles may be accomplished by any conventional method, e.g., vacuum, scraping, filtration, conveyor belts, drum drop-off, centrifugation, etc., and the recovered particles may be used in the manufacture of various useful products such as sausage, hamburg, frankfurts, etc. Further, any type of striated meat products may be used instead of beef plate (e.g., veal, pork, mutton, etc.) using the techniques exemplified by Example 5.

This invention is limited only by the claims which follow hereinbelow.

What is claimed is:

1. A process for reducing the fat content of fat-containing meat which comprises the steps of:
    (a) comminuting a frozen portion of the fat-containing meat so as to obtain a mixture of substantially discrete frozen meat particles and substantially discrete frozen fat particles; and
    (b) mechanically separating the mixture resulting from step (a) into a substantially meat particle phase and a substantially fat particle phase.

2. The process of claim 1 in which step (b) is carried out by treating the mixture resulting from step (a) with an inert fluid so as to cause the mixture to separate, within the fluid phase, into a substantially meat particle phase and a substantially fat particle phase.

3. The process of claim 2 in which the fluid is a gas selected from the group consisting of air, nitrogen, carbon dioxide, fluorinated hydrocarbons and chlorofluorinated hydrocarbons.

4. The process of claim 3 in which the mixture resulting from step (a) is subjected to freeze-drying prior to carrying out step (b).

5. The process of claim 2 in which the fluid is an edible oil having a density in the range of about 0.915 to about 1.05.

6. The process of claim 2 in which the separation of the mixture into phases is caused by centrifugation.

7. The process of claim 2 in which the fluid is water and the initial temperature of said water immediately prior to treatment with the mixture resulting from step (a) is as low as about 33° F.

8. The process of claim 7 in which the water phase is, subsequent to the separation into the meat particle and fat particle phases, recovered and recycled for re-use in step (b).

9. The process of claim 7 in which the substantially fat particle phase is skimmed off the surface of the water and the substantially meat particle phase is recovered from the water.

10. The process of claim 9 in which the substantially meat particle phase is recovered from the water by filtration.

11. The process of claim 1 in which the meat is selected from the group consisting of beef, pork and mutton.

12. The process of claim 1 in which step (b) is carried out by passing the mixture resulting from step (a)

over a cold surface maintained at a temperature of 0° F.–32° F. to cause the meat particles to adhere to said surface.

13. The process of claim 1 in which the mixture resulting from step (a) is passed over a hot surface maintained at a temperature of at least the softening point of the fat but insufficient to melt the fat to cause the fat particles to adhere to said surface.

14. The process of claim 1 in which the mixture resulting from step (a) is passed over a plurality of detection cells which will detect the presence of the meat particles and thereafter the mixture is passed over a plurality of inert gas jets such that the mixture is subjected to a stream of inert gas having a velocity and duration proportional to amount of meat particles detected by the color detection cell and the meat particles are blown upward by said stream, and collected apart from the fat particles.

15. The process of claim 1 in which step (b) is carried out by passing the mixture resulting from step (a) between electrically charged plates in a manner such that the meat particles will adhere to one of said plates and the fat particles will adhere to the other plate.

16. A process for reducing the fat content of fat-containing meat which comprises the steps of:
(a) comminuting a frozen portion of said fat-containing meat so as to obtain a mixture of substantially discrete frozen meat particles and substantially discrete frozen fat particles;
(b) treating the mixture resulting from step (a) with a water phase at an initial temperature of as low as about 33° F. to cause at least partial thawing of the meat particles without substantial melting of the fat particles; and
(c) skimming the resultant substantially fat particles from the surface of the water phase and thereafter filtering to recover the substantially meat particles from the water phase.

17. A process for reducing the fat content of fat-containing meat which comprises the steps of:
(a) comminuting a frozen portion of beef plate in a manner so as to obtain a mixture of substantially discrete frozen meat particles and substantially discrete frozen fat particles with the average particle size of the fat particles being less than that of the meat particles;
(b) treating the mixture resulting from step (a) with a water phase at an initial temperature of as low as about 33° F. to cause at least partial thawing of the meat particles without substantial melting of the fat particles; and
(c) centrifuging the mixture resulting from step (b) and recovering the separated meat and fat particles from the water phase.

18. A process for reducing the fat content of fat-containing meat which comprises the steps of:
(a) comminuting a frozen portion of beef plate in a manner so as to obtain a mixture of substantially discrete frozen meat particles and substantially discrete frozen fat particles with the average particle size of the fat particles being less than that of the meat particles; and
(b) screening the mixture resulting from step (a) with a sieve whose openings are equal to or larger than the average particle size of the fat particles but are smaller than the average particle size of the meat particles.

19. The process of claim 18 including the additional steps of:
(c) treating the mixture of particles which is not retained on the sieve in step (b) with a water phase at an initial temperature of as low as about 33° F. to cause at least partial thawing of the meat particles without substantial melting of the fat particles; and
(d) centrifuging the mixture resulting from step (c) and recovering the separated meat and fat particles from the water phase.

References Cited
UNITED STATES PATENTS

| | | | |
|---|---|---|---|
| 2,352,154 | 6/1944 | Walter | 99—108 |
| 3,008,831 | 11/1961 | Christianson | 99—108 X |

HYMAN LORD, Primary Examiner

U.S. Cl. X.R.
426—442, 480, 524